United States Patent [19]
Rusk, Jr. et al.

[11] Patent Number: 5,849,124
[45] Date of Patent: Dec. 15, 1998

[54] COMPOSITE FLOORING SYSTEM

[75] Inventors: Joseph A. Rusk, Jr.; Joseph Mendez; Michael D. Fazio, all of Staten Island, N.Y.

[73] Assignee: Colorstone, Inc., Rahway, N.J.

[21] Appl. No.: 438,394

[22] Filed: Apr. 4, 1995

[51] Int. Cl.$^6$ .................................................. B32B 5/16
[52] U.S. Cl. ........................... 156/71; 156/63; 156/276; 264/31; 264/109; 427/203; 427/218
[58] Field of Search .................................. 427/218, 203; 156/71, 63, 276, 279; 52/181; 264/31, 109

[56] References Cited

U.S. PATENT DOCUMENTS

| | | | |
|---|---|---|---|
| 1,838,287 | 12/1931 | Schreurs | 427/218 |
| 1,931,754 | 10/1933 | Denning | 427/218 |
| 2,123,419 | 7/1938 | Gundlach | 427/218 |
| 3,003,905 | 10/1961 | Piacente . | |
| 3,092,836 | 6/1963 | Boggus . | |
| 3,097,080 | 7/1963 | Weir . | |
| 3,099,574 | 7/1963 | Bernier | 427/218 |
| 3,135,647 | 6/1964 | Wheeley . | |
| 3,194,856 | 7/1965 | Palmer . | |
| 3,265,647 | 8/1966 | Schaeffer et al. . | |
| 3,305,506 | 2/1967 | Murray . | |
| 3,344,011 | 9/1967 | Goozner . | |
| 3,371,135 | 2/1968 | Goodwin . | |
| 3,441,457 | 4/1969 | Regnaud . | |
| 3,470,012 | 9/1969 | Rollette | 427/218 |
| 3,690,914 | 9/1972 | Andreski | 156/71 |
| 3,806,562 | 4/1974 | Lamort et al. . | |
| 4,054,699 | 10/1977 | Brinkley | 156/71 |
| 4,196,243 | 4/1980 | Sachs et al. . | |
| 4,256,501 | 3/1981 | Banino . | |
| 4,267,222 | 5/1981 | Sanders . | |
| 4,341,824 | 7/1982 | LeGrand . | |
| 4,347,272 | 8/1982 | Schmidt . | |
| 4,405,683 | 9/1983 | Renker . | |
| 4,443,392 | 4/1984 | Becker et al. . | |
| 4,460,629 | 7/1984 | Haraga et al. . | |
| 4,664,955 | 5/1987 | Clem . | |
| 4,804,569 | 2/1989 | Arisawa . | |
| 4,873,145 | 10/1989 | Okada et al. . | |
| 4,981,539 | 1/1991 | Toncelli . | |
| 5,053,274 | 10/1991 | Jonas . | |
| 5,141,688 | 8/1992 | Gribble . | |
| 5,185,192 | 2/1993 | Banus . | |
| 5,218,013 | 6/1993 | Schock . | |
| 5,262,240 | 11/1993 | Dunning et al. . | |
| 5,314,535 | 5/1994 | Lynch et al. . | |
| 5,339,589 | 8/1994 | Thrower . | |

FOREIGN PATENT DOCUMENTS 295956  8/1928  United Kingdom .................. 427/218

OTHER PUBLICATIONS

Brochure describing HVC Vibratory Mechanical Conveyors Eriez Magnetics, Erie, Pennsylvania, U.S.A., 1991.

*Primary Examiner*—Geoffrey L. Knable
*Attorney, Agent, or Firm*—Frishauf, Holtz, Goodman, Langer & Chick

[57] ABSTRACT

In a method of preparing a composite flooring, a quantity of small stones is mixed with a predetermined quantity of liquid colorant in a mixing device for a predetermined period of time, to produce colored stones. The stones and colorant are in a ratio of about 400 lbs of stone to about 1 gallon of colorant. The colored stones are dried and are mixed with an epoxy resin. The mix of stones and epoxy resin is poured onto a floor surface and leveled, for example by troweling. One or more epoxy seal layers are thereafter preferably applied, and a wear layer of polyurethane is preferably applied over the one or more seal layers. A flooring sheet displaying a design, for use in a flooring system, is made by projecting an image of a predetermined design to be reproduced on a sheet surface; outlining said projected image on the sheet surface; providing raised divider members on said sheet surface, along said outline to define a divided design on said sheet surface, said divided design having sections which are to have given colors; and then pouring a mixture of color dyed stones and an epoxy resin into said sections of said divided design to reproduce colored portions of said design in said sections, to thereby form a design sheet member, which may be included in an above-described floor which is poured therearound.

16 Claims, 7 Drawing Sheets ated to flooring systems, and more particularly to a flooring system comprising colored stones or aggregates which are mixed with an epoxy resin to provide a flooring system which is to be poured and troweled for forming the flooring.

COMPOSITE FLOORING SYSTEM

BACKGROUND OF THE INVENTION

This invention relates to flooring systems, and more particularly to a flooring system comprising colored stones or aggregates which are mixed with an epoxy resin to provide a flooring system which is to be poured and troweled for forming the flooring.

The invention further relates to a technique of coloring stones in a consistent and highly accurate manner, and to a system for making color-matched logo design floor inserts.

Various systems are known for producing flooring comprising particulate material embedded in an epoxy-type resin material. However, the known systems are defective in at least one of the following properties: ease of application; accuracy of coloring of the stone or other aggregate material used in the floor; and precision or repeatability of coloring of stones so that one batch can accurately match an earlier-produced batch. Furthermore, the prior art systems are limited in colors available. Normally, only darker colors, totalling about 30 of such darker colors, may be available.

Concerning ease of application, a disadvantage of the known systems is the high rate of color bleeding from the aggregate into the epoxy when mixed. This occurs especially when the prior flooring is "over-troweled". When over-troweled the prior flooring tends to blemish, probably due to a combination of heat from the epoxy setting and the mechanical friction of the trowel. In any case, the result is that one must be particularly careful when troweling the known flooring. The ability of the present invention to allow additional troweling without blemishing, allows the production of a floor of much improved quality.

The object of the present invention is to provide a system which overcomes the above disadvantages of the prior art, to provide a crisp, clean, easy to apply, flooring product. In addition, 7000 or more colors or shades of colors are easily and reproducibly accomplished.

SUMMARY OF THE INVENTION

According to the invention, a method of preparing a composite flooring comprises providing a quantity of small stones; mixing said quantity of small stones with a predetermined quantity of liquid colorant in a mixing device for a predetermined period of time, to produce colored stones; drying the colored stones after they have been mixed with said liquid colorant for said predetermined period of time; mixing said dried colored stones with an epoxy resin to form a mix; pouring said mix of stones and epoxy resin onto a floor surface; substantially evening out the surface of said poured mix on said flooring surface; applying a first epoxy layer over the poured mix after evening thereof; smoothing the upper surface of said first epoxy layer poured thereover; and permitting the poured materials to dry and harden, to complete the composite flooring system. If tiles are to be made, a flexibilizer is used so that the completed product will be less rigid, and tiles are either cut from a large cast sheet or cast to the deemed size.

The method preferably further comprises applying a second epoxy layer over said dried first epoxy layer, and then applying a polyurethane wear coat over the second epoxy layer after it dries and hardens.

According to the present invention, in a method of preparing a composite flooring wherein colored stones are mixed with an epoxy resin and the mixture poured onto a floor support, troweled smooth and sealed with a seal coat, an improvement comprises coloring the stones by a process comprising the steps of:

(a) mixing stones (preferably white quartz stones) with colored latex paint in a ratio of about 400 lbs of stones to about 1 gal. of latex paint whereby the stones become coated with the latex paint; and thereafter (b) allowing the paint coated on the stones to harden before mixing with the epoxy flooring.

Preferably, the latex paint contains 0.5 to 3% of a cross-linking agent for the paint to improve the hardening of the paint.

According to another aspect of the invention, a method of manufacturing a flooring sheet displaying a design, for use in a flooring system, comprises projecting an image of a predetermined design to be reproduced on a sheet surface; outlining said projected image on said sheet surface; providing raised divider members on said sheet surface, along said outline to define a divided design on said sheet surface, said divided design having sections which are to have respective colors; pouring a combination of color dyed stones and an epoxy resin into said sections of said divided design to reproduce colored portions of said design in said sections, to thereby form a design sheet member; drying said design sheet member; removing said dried design sheet member from said sheet surface; and applying said removed design sheet member to a floor.

DETAILED DESCRIPTION

Figure 1:
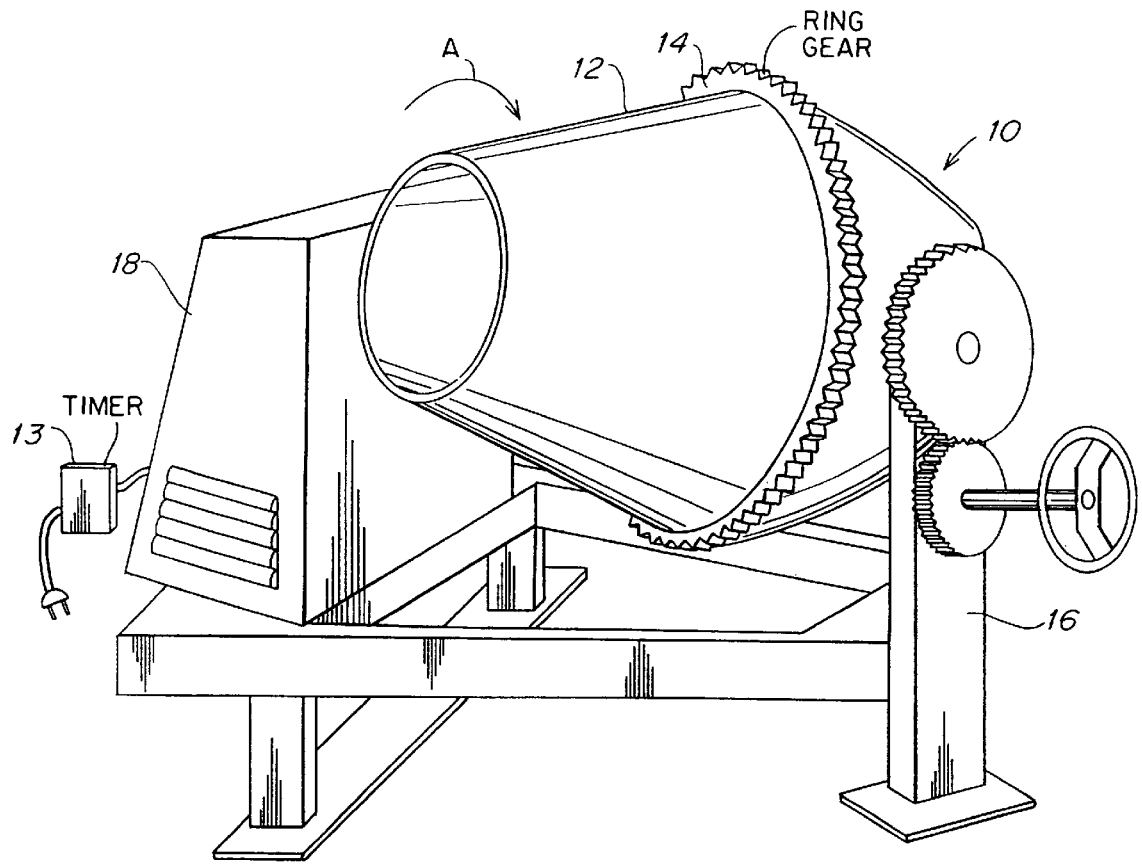
FIG. 1 is a perspective view of a mixing machine which is used for coloring stone, according to the present invention.

Referring to FIG. 1, a tumbling or mixing machine 10 comprises a rotating hopper 12 having a ring gear 14 around an outer circumferential portion thereof, and which is rotatably mounted on a stand 16. The tumbler is rotated in the direction of the arrow A about the longitudinal axis of the mixing unit or hopper 12, by means of a motor or the like and a gear mechanism contained in a housing 18. Such a machine is well known in the art and is used, for example, in mixing of cement. The tumbler 12 of FIG. 1 rotates at about 28 RPM. A schematic showing of portions of the well known mixing machine 10 is shown in FIG. 1A.

Figure 1A:
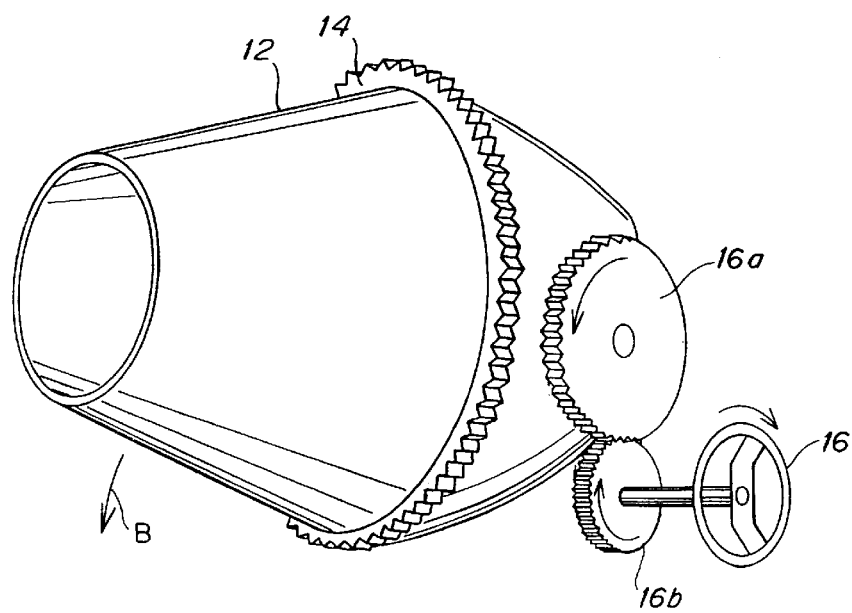
FIG. 1A is a schematic drawing showing portions of the mixing machine of FIG. 1 in detail.

Referring to FIG. 1A, the hopper or mixing unit 12 is rotated by means of a ring gear 14 in a manner well known in the art. The hopper 12 is tilted downwardly in the direction of the arrow B in FIG. 1A by rotating the handle 16, which, through gears 16a, 16b causes the hopper of mixing unit 12 to tilt downwardly to discharge the contents thereof after the mixing is completed.

According to the present invention a preferred coloring operation comprises adding about 400 pounds of stone to the rotatable hopper 12 with about one gallon of liquid colorant (dye). The range of diameters of the stone is about 1/16" to about 1/4". The stone is preferably white quartz stone, so that the stones can be accurately and consistently colored from batch-to-batch. For highest accuracy in color reproduction, the weight of the stone should preferably not be varied by more than about 10 pounds in 400 pounds, in either direction (that is, for a 400 pound batch, about 410 pounds is the maximum and about 390 pounds is the minimum) for use with one gallon of liquid colorant. For highest accuracy in coloring, the amount of colorant should preferably not vary by more than about 2 ounces per gallon.

The amount of time that the stone is tumbled in the tumbler 12 is an important factor. The stones are preferably tumbled with the liquid colorant for about 7 to about 10 minutes. The stones could be tumbled with the colorant for about 5 to about 15 minutes. Below about 5 minutes, the colorant forms lumps and uneven coloring of the stone results. Above about 15 minutes of tumbling the coloring tends to wear off the stones due to excessive abrasion. Therefore, about 7 to about 10 minutes of tumbling is preferred, and about 8 to about 9 minutes is more preferred. A tumbling time of about 8 minutes has been found to be optimal with the presently described batch sizes and equipment. Each batch should preferably be tumbled precisely the same amount of time as the batch before, especially if the batches are to be matched or used on the same job or lot. That is, if three loads of stone (nominally 400 pounds each) are to be used for a particular job or are to be labeled as one lot number, the amounts of stone and colorant should preferably be within about 10% of the actual desired values and preferably exactly the same (or as close as possible), and the amount of time that each load is allowed to tumble in the machine of FIG. 1 should preferably be within about 10% and preferably precisely the same (or as close as possible). An automatic timer 13 (see FIG. 1), connected to the power supply for the mixing machine 10, is used to turn off the tumbler to control the tumbling time in an accurate manner. The timer 13 could instead be wired into the motor drive circuit (inside housing 18) for the drive motor for the ring gear 14.

With commercially available equipment the stone can be colored in amounts of about 100–1200 lbs per batch. As a practical matter this done in 50 or 100 lb. increments from 100 to 1200 lbs. e.g. 100, 150, 200, etc. It is only necessary that the proportional amount of colorant to stone be maintained. For example, as mentioned above, one gallon of colorant is used per 400 pounds of stone. Therefore, for 600 pounds of stone, about 1½ gallons of colorant must be used. Of course it is possible to envisage larger or smaller sized equipment wherein other ranges of amounts can be accommodated. Thus, it is not intended that the invention be limited to batch quantities of 100–1200 lbs.

Ranges at which acceptable results can be obtained in the coloring process of the present invention include for example, the following:

| LBS. OF STONE (AGGREGATE) | /OZS. OF LIQUID COLORANT |
|---|---|
| 25–75 | 14–18 ozs. |
| 75–125 | 28–36 ozs. |
| 125–175 | 42–54 ozs. |
| 175–225 | 56–72 ozs. |
| 225–275 | 70–90 ozs. |
| 275–325 | 84–108 ozs. |
| 325–375 | 98–126 ozs. |
| 375–425 | 112–144 ozs. |

Preferably, the stone sizes used in the method of the present invention are #1, #2 and #3 as defined below:

| | % RETAINED ON MESH NUMBER | | |
|---|---|---|---|
| Screen Size | #1 | #2 | #3 |
| 4 | | | |
| 6 | | | 1.5 |
| 12 | 5.3 | 69.6 | 93.4 |
| 20 | 94.0 | 29.8 | 5.0 |
| 30 | 0.5 | 0.6 | 0.1 |
| 40 | 0.2 | | |
| 50 | | | |

COLORANT

The liquid colorant used in the present invention can be a commercially available latex paint such as available from Benjamin Moore. Preferably this is an outdoor latex paint which most preferably has been modified with added crosslinker to harden the latex paint. These preferred embodiments reduce color deterioration of the aggregate or stone during handling of the flooring. After hardening, the epoxy flooring provides additional protection to the colored aggregate or stone.

A typical formulation for the latex paint base or carrier for the colorant is a latex paint base containing about 0.5–2% titanium dioxide; 1.5–4% zinc oxide; about 10–20% silica; 15–40% linseed alkyd modified vinyl acrylic resin; up to about 0.5% 2-noctyl-4-isothiazolin-3-one; and about 40–60% water. One preferred formulation is shown below:

| | |
|---|---|
| TITANIUM DIOXIDE | 0.8% |
| ZINC OXIDE | 2.5% |
| SILICA | 15.1% |
| LINSEED ALKYD MOD. VINYL ACRYLIC RESIN | 26.3% |
| WATER | 55.2% |
| 2-N-OCTYL-4-ISOTHIAZOLIN-3-ONE | 0.1% |
| | 100.00% |

To the base or carrier can be added any commercial paint colorant or pigment normally used in a latex paint base, to obtain the required color. As a practical matter, latex paint can be ordered from a manufacturer already colored or custom color-mixed at a retail paint store.

Although commercial latex paints, and especially those formulated for exterior conditions provide useful results, for the best results, a cross-linking agent (also known as a hardener or curing agent) is added.

CROSS-LINKING AGENT (COLORANT)

The cross-linking agent (or hardener) is added primarily to protect the color coating on the aggregate during hardening. After the flooring epoxy has hardened, the hardened or cured epoxy provides the primary protection in use. The cross-linking agent restrains color bleeding when the aggregate (stone) is mixed with the epoxy.

Any cross-linker usable with latex emulsions such as latex paints, can be employed to advantage. These include aziridines or isocyanates.

The cross-linking agent should be added in an amount of 0.5–3 ounces to a gallon and more preferably in an amount of about 1 ounce per gallon. This provides a more durable finish without causing undue handling difficulties associated with too rapid drying (hardening) of the colorant.

The colored stone or aggregate of the present invention has high color consistency throughout in each batch and high color reproducibility from batch to batch. Therefore its use for flooring provides superior results.

CONTINUOUS FLOORING

The present invention colored aggregates or stones can be used to replace prior colored stones or aggregate in any epoxy-encapsulation flooring system.

One system which has been found to produce favorable results is an epoxy flooring system based on biphenyl A epoxy and cresyl glycidyl ether. This system is commercially available under different names including EPALLOY e.g. EPALLOY 7190676 (™ of CL Industries).

Another system is the EPON(R) Resin 862, available from Shell, which is a Bisphenol F/epichloiohydrin epoxy resin system.

These flooring systems are used in the normal manner including the addition of wetting agents to help coat the stones and improve the trowelability of the flooring and subsequent application of "sealer" and "wear" coats. The resin and curing agent of the flooring system are usually combined in a ratio of about two parts epoxy to one part curing agent, depending on manufacturers instructions. These are mixed for about 50 seconds. The stones are mixed in a ratio of about 40 pounds of stones to 3 pints of resin/curing agent mixture and mixed for about 50 seconds. This mixture is then poured on the floor and troweled to make a continuous flooring. After curing, the sealing and wear coats are applied.

Example 1

400 lbs of stone is mixed with 1 gallon of Benjamin Moore(™) latex paint which contains a blue pigment, in a tumbler 12 (FIG. 1) rotating at about 25–28 rpm for 8 minutes. The latex paint contains 1.5 ozs. per gallon of an isocyanate latex cross-linker.

After mixing, the stone is spread on a clean surface (cement floor) to dry. Depending on the amount of cross-linker present, this can take from about 1 to 3 hrs and normally about 2 to 3 hours.

Figure 2:
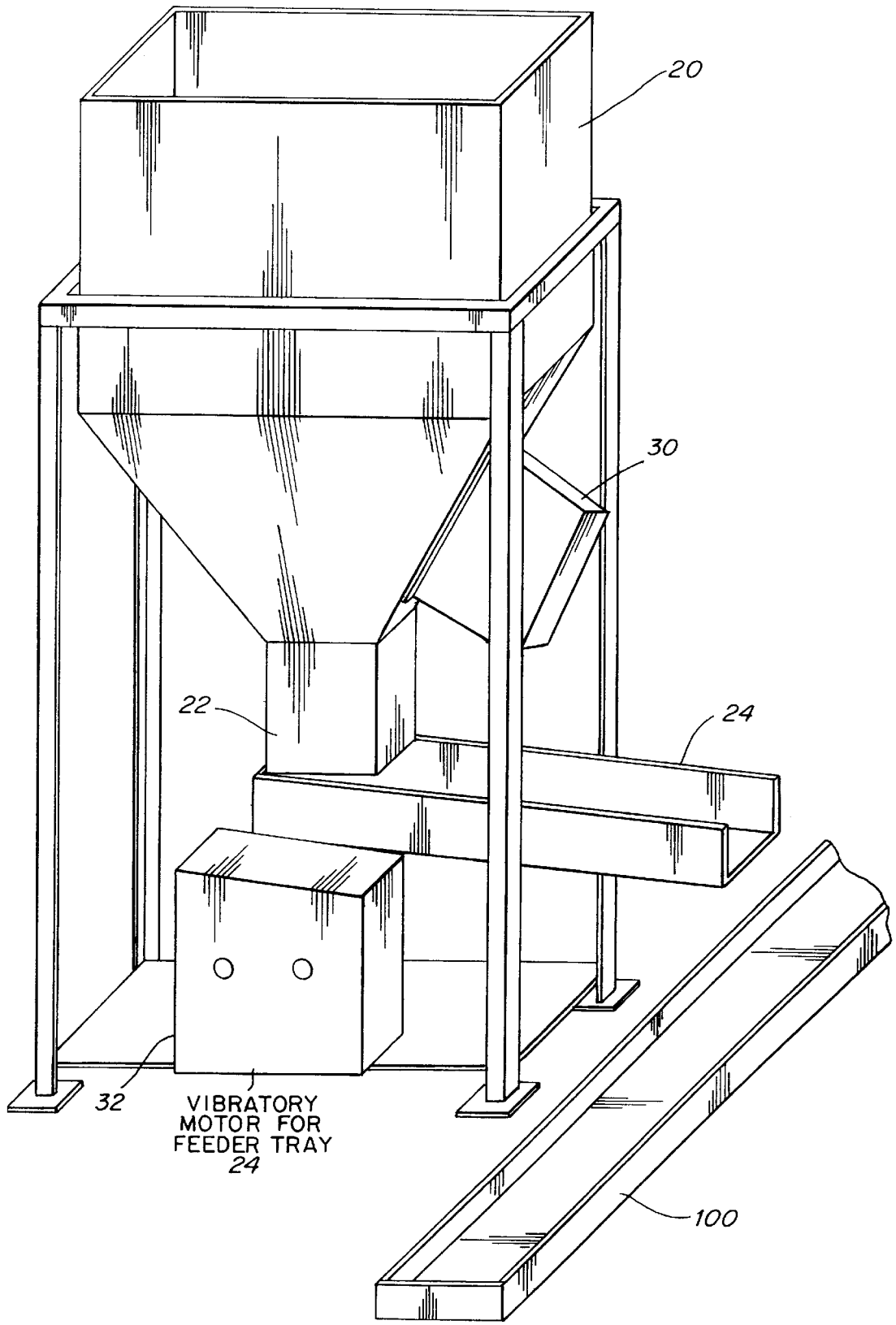
FIG. 2 is a perspective view of a feeder machine for receiving stones colored with the mixing machine of FIG. 1 and for feeding the colored stones to a drying conveyor.
Figure 3:
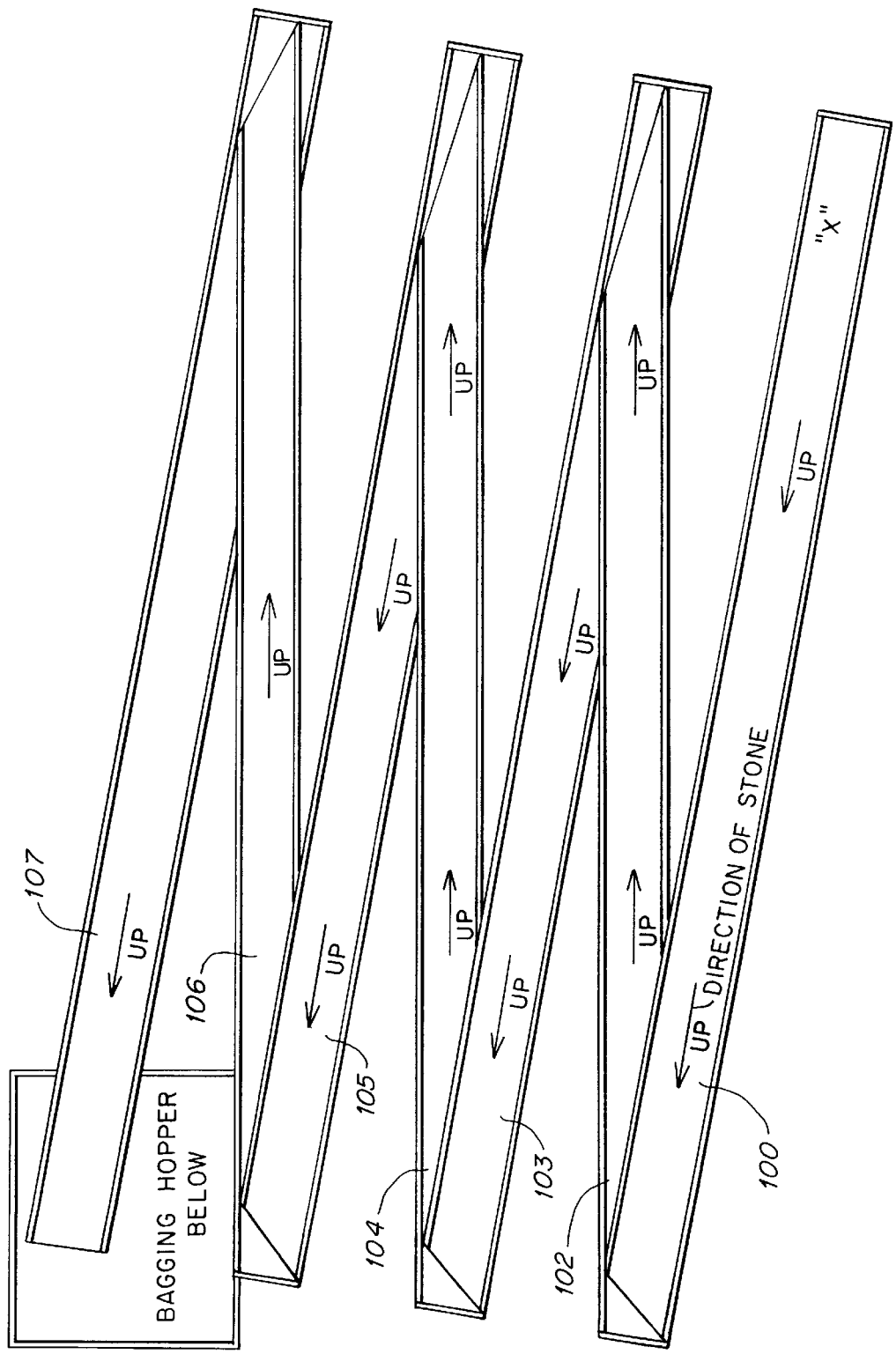
FIG. 3 is a top view of a vibratory conveyor system used to dry the stones after being colored, and for feeding the dried stones to a bagging unit.

Alternatively, the stones are colored (dyed) in the mixing machine 10, the contents of the mixing machine is discharged into a hopper unit of FIG. 2, and then via the hopper 20, and feeder units 22 and 24, onto a vibratory conveyor system of FIG. 3. FIG. 3 is a top view of the vibratory conveyor system which shows a plurality of elongated vibratory conveyors arranged in tandem. As shown in FIG. 3, the stones are discharged onto the portion "X" of the lowermost conveyor section 100. The conveyor section 100 is vibrated and the stones are moved in an upward direction along the conveyor 100, and are then dropped onto the left end of the next successive vibratory conveyor section 102. Section 102 vibrates and the stones are moved upward in the direction of the arrow, and are then dropped on the right end of conveyor section 103, and the stones continue to move upward along vibratory section 103. The stones are successively moved upward along the stacked vibratory conveyor sections 104, 105, 106 and 107, until they reach an upper level at a height of a bagging hopper, (not shown). A typical vibratory conveyor is high volume model HVC Mechanical Conveyor manufactured by Eriez Magnetics, Erie, Pa. Other vibratory mechanical conveyors could be used, as desired. Each conveyor section of FIG. 3 conveys the stones in an upward direction along the length of the respective conveyor sections, and each conveyor section, after raising the stones to a higher level, drops the stones to the lower end of the next successive upwardly inclined conveyor section. The vibratory conveyor system of FIG. 3 enables drying of the stones in about 10–15 minutes instead of 2–3 hours when just laying the stones out on a concrete drying surface.

The "climbing" type of vibratory conveyor used in the present invention is used since it takes up less space than a simple horizontal system.

To form the floor, the dried colored stone is mixed with EPALLOY 7190676 (™ of CL Industries) flooring epoxy.

The EPALLOY flooring epoxy is prepared by mixing 2 pints of the epoxy resin (usually referred to as "Part A") with one pint of the epoxy resin hardener (usually referred to as "Part B"). The two are mixed for about 50 seconds. The resulting 3 pints of resin flooring is mixed with about 40 lbs of the colored stone, for about 50 seconds.

The flooring/colored stone mixture can then be applied in the usual way by pouring it on the sub-floor or floor base and troweling the mixture flat. This is normally followed with an epoxy seal coat or coats and a finish coat.

FLEXIBLE TILE FLOORING

By adding a commercial flexibilizer to the epoxy flooring system, it is possible to produce a product which can be cast or cut into floor tiles of any desirable size. The flexibilizer is an epichlorohydrin castor oil based epoxy which is used to replace about 40% of the usual epoxy supplied with the flooring epoxy system. A 60/40 mixture, by volume, of the flooring epoxy/flexibilizer is made and this is used as the epoxy for the flooring system. Usually, this is mixed in a ratio of 2:1 with the flooring curing or hardening agent. The result is a tile that can be applied with adhesives onto a floor base.

Example 2

Preparation of Colorstone Flexible Tiles

Flexible tiles are made in a manner similar to the floor except that about 40%±5% by volume of the epoxy resin ("Part A") is replaced with a commercial flexibilizer such as HELOXY (®) 505 (by Shell Oil Company, Houston, Tex.).

HELOXY (®) 505 is an epichlorohydrin castor oil-based epoxy resin that imparts to the hardened tile, sufficient flexibility for handling and laying employing usual floor tile laying procedures including using floor tile adhesives.

Referring to EXAMPLE 1, the two pints of epoxy resin ("Part A") are replaced by a 60/40 vol/vol mixture of the epoxy resin/HELOXY (®) 505. Following the above example, this is mixed with one pint of the flooring epoxy hardener ("Part B"). The mixture is stirred for about 50 seconds and then mixed with 40 lbs of the colored stone for about 50 seconds.

The resulting flooring mixture is cast into a sheet and after hardening, if desired, seal coats and a wear layer can be applied, for example as described below with respect to the production of logos and design. After the sheet is cured, the sheet is cut into 12"×12" tiles. Alternatively, the resulting flooring mixture could be cast directly into 12"×12" (or any other size) tiles, and coated with epoxy seal coats and a wear layer.

PRODUCTION OF LOGOS AND DESIGNS

Using the technique of the present invention, designs and/or logos can be accurately reproduced and installed in a floor. The logo or other design is preferably pre-produced in sheet form before the floor is actually laid down, and is transported to the flooring site.

The technique for producing the logo or other designs in flooring sheet form is described hereinbelow. The technique will be described with respect to a bowling pin design, for simplicity. However, more intricate designs and/or logos could be reproduced, using multi-colors, where applicable, using the same techniques.

Figure 4:
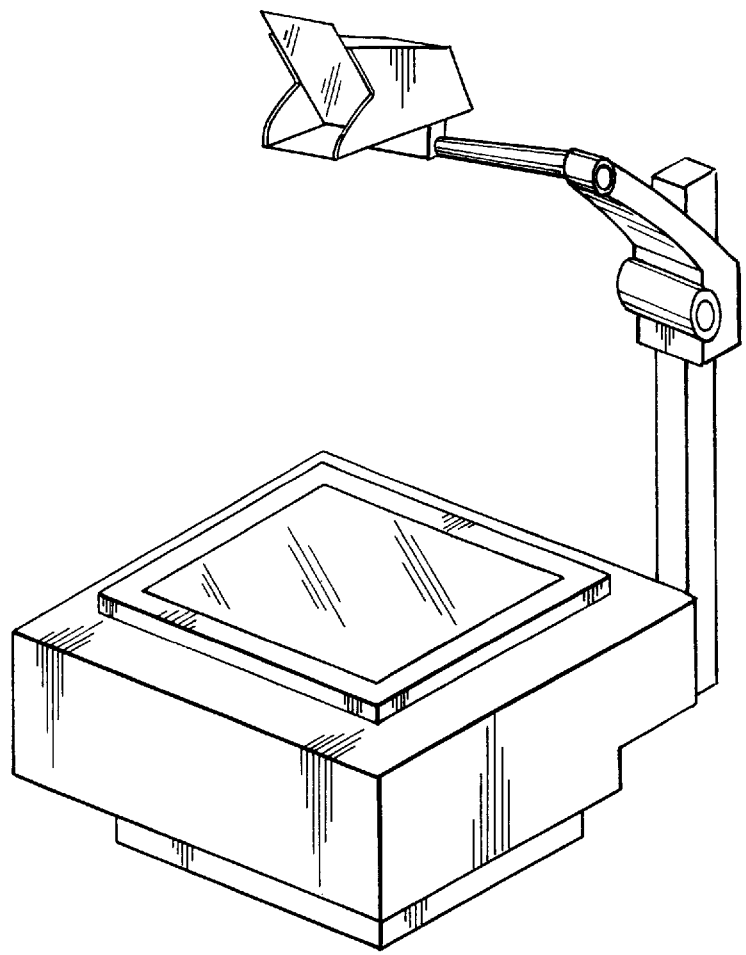
FIG. 4 shows a typical overhead projector, in simple schematic form, for use in producing logos or other designs in flooring sheet form.

When a design of a bowling pin is to be reproduced in a flooring system, a picture of the bowling pin (or other artwork) is projected using an overhead projector of standard type (see FIG. 4), for example, an overhead projector manufactured by 3M (Minnesota Mining & Manufacturing Company), Model No. B10TM90501-1, or any other suitable overhead projector. Such a typical overhead projector is shown schematically in FIG. 4. If the original design artwork is in the form of a slide, a slide projector could be used. The image of the bowling pin or of a picture of a bowling pin is projected onto a sheet of, for example, high-density polyethylene 30 which has been mounted vertically onto a wall. See FIG. 5. Preferably, the sheet is about ¼ inch thick. By moving the overhead projector, or by moving the location of the high-density polyethylene sheet, or by varying or adjusting the optics, the size of the image to be reproduced can be changed. The closer the projector is to the polyethylene sheet 30, the smaller will be the image, and vice versa.

Once the image size is determined, the outlines and details of the design (bowling pin in the present simplified description) are then drawn onto the high-density polyethylene sheet using, for example, a black marker, following the outline of the projected image. After the design is drawn, the polyethylene sheet 30 is removed from its vertical position and is placed flat on a table or other support surface, in a horizontal position.

Divider strips 32 are then glued or otherwise mounted in place on the polyethylene sheet along the marked outlines of the image. See FIG. 5. The divider strips 32 are preferably made of metal, such as aluminum or brass, and are preferably glued in place using a standard commercial grade hot melt glue gun. The metal dividing strips 32 are preferably about ¼ inch high by about 1/16 inch wide or about 1/8 inch wide. See FIGS. 6A and 6B which show the two different types of dividing strips. Instead of metal dividing strips, flexible plastic dividing strips could be used.

Figure 5:
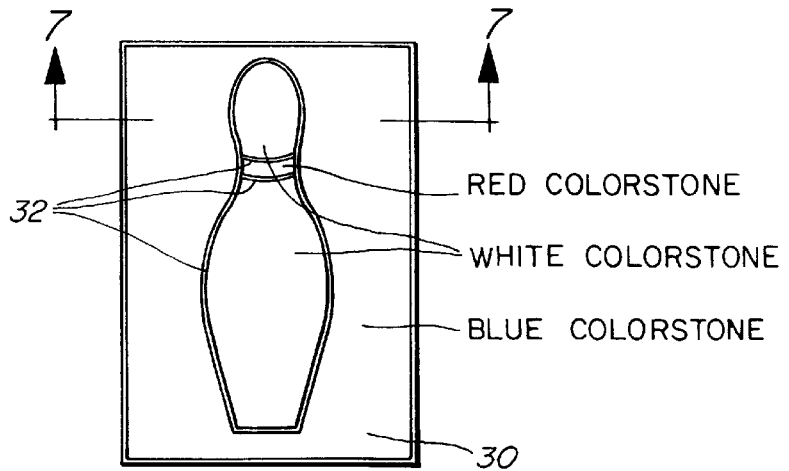
FIG. 5 illustrates a projection of a design of a bowling pin on a sheet 30.
Figure 6A:
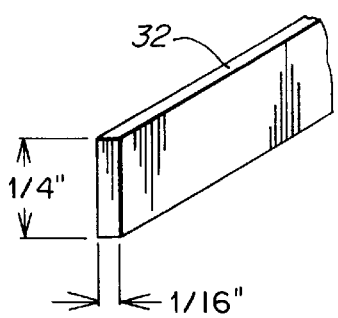
FIGS. 6A and 6B show examples of dividing strips.
Figure 6B:
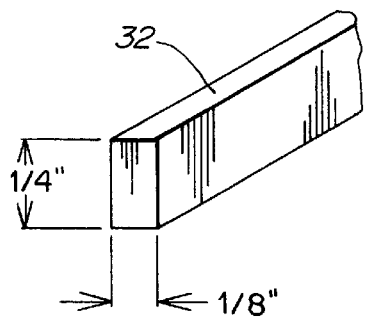
Figure 7:
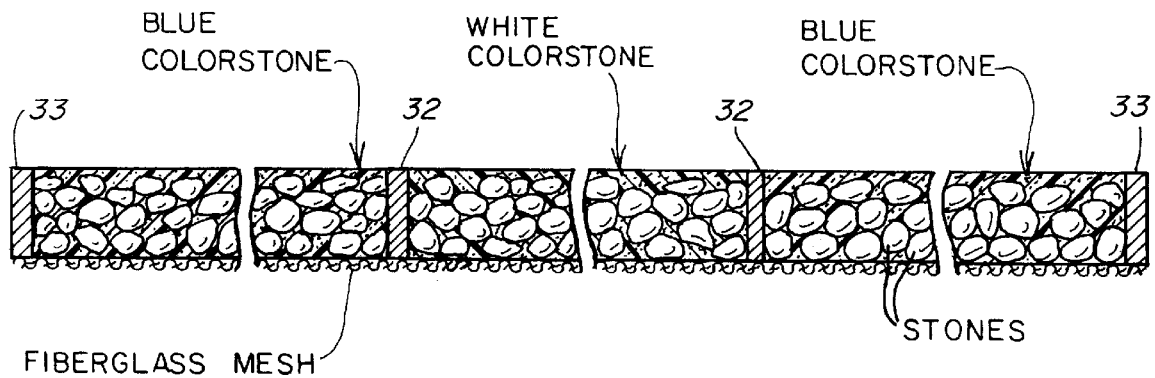
FIG. 7 is a sectional view taken along line 7—7 in FIG. 5.

After the dividing strips 32 are mounted on the polyethylene sheet 30, as shown in FIG. 5, the mixed stones and epoxy resin (mixed in accordance with the preceding discussion of for example, FLOORING, and EXAMPLES 1 and 2) are poured into the various divided sections of the logo sheet shown in FIG. 5. As shown in FIG. 7, a divider or edging strip 33 is also provided around the outer periphery of the logo sheet of FIG. 5 to retain the poured stones therein. As shown in FIG. 5, white-colored stone mix is poured into the white portions of the bowling pin, red-colored stone mix is poured into the red portion of the bowling pin, and a blue-colored stone mix is poured into the background area, for example. The stone and epoxy mix is troweled or otherwise smoothed or leveled. Usually at least one additional epoxy layer is poured thereon (as previously described). After the additional sealing epoxy layer is dried, a second sealing epoxy layer may be poured thereon, and is permitted to dry. For best results, the two epoxy sealing layers are used and after drying of the second epoxy layer, a finish or wear layer of, for example, polyurethane, is applied and is permitted to dry, as described hereinabove.

In the above-described logo making system, the dividing strips 32 remain in place and form an integral part of the logo design on the logo sheet member.

The projected and marked design may also be produced without the permanent use of metal or plastic dividing strips 32, for example by applying a product such as "butcher's wax" or other release agent to the dividing strips 32 prior to pouring the stone-epoxy mix, and removing the strips 32 after each color is poured and is hardened. The "butcher's wax" or other release agent keeps the epoxy mix from bonding to the divider strips. As an example, the divider strip that surrounds the outer outline of the bowling pin in FIG. 12 could be removed after the white stone mix has been poured and hardened, and after the red stone mix has been poured and hardened (after the strips between red and white have been removed). Then the blue stone-epoxy mix is poured after removal of the remaining divider strips 32. Using this technique, the resultant logo design does not have permanent metal or plastic dividing strips, and the colors are immediately adjacent each other.

Figure 8:
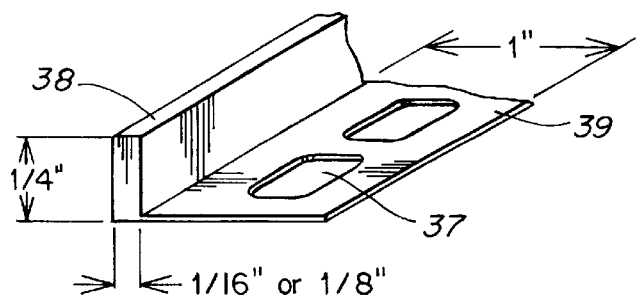
FIG. 8 shows a modified view of divider strips.

The dividing strips 32 described hereinabove can be replaced with modified dividing strips 38 shown in FIG. 8. The modified dividing strips 38 have right angle projections or legs 39 which help to hold them in place when they are glued or otherwise adhered to the backing surface, such as the polyethylene sheet or a plywood sheet. Openings 37 are provided in the legs 39 to improve adherence by means of adhesive. Strips such as shown in FIG. 8 are readily available and are commonly known as "terrazzo" strips.

As described above, the divider strips 32 may be retained in place and become part of the overall logo design, serving to divide the various colors from each other, or they can be removed during fabrication. When the divider strips 32 are removed, the manufacturing time is increased, since it is necessary to wait until each color completely dries before proceeding to pouring the next color stone mix.

After all of the colored stone sections have been poured and have hardened, the logo design section is ready to be sealed (in the same manner as the previously described flooring system is sealed). Using the epoxy mix used in the previously described overall flooring system (the same epoxy that is mixed with the stones), the epoxy system parts are mixed and poured over the entire pre-formed logo portion of FIG. 5, thereby flooding it with epoxy. A rubber squeegee is used to move the epoxy around and to work it into the logo voids and crevices. When all of the voids and crevices have been filled, the logo section is allowed to dry for about six to ten hours, or overnight. A second epoxy sealing coat is then poured onto the logo sheet in the same way, and spread out and worked in using, for example, the rubber squeegee. After this is completed, a clean nylon loop roller is run over the surface of the epoxy using a conventional paint roller handle. Such a roller device is generally used for paint and is readily available at commercial or retail-hardware or paint stores. The loop roller "evens" out the surface by pulling the excess resin from the surface of the logo and redistributing the pulled out excess resin over the entire surface evenly, thereby eliminating "puddling" of epoxy. The second seal coat of epoxy is then allowed to dry again for six to ten hours, or overnight.

A "wear coat" coating of polyurethane, conventionally designed for use on epoxy floors, is then used to put a "wear coat" on the logo portion. The wear coat is preferably a conventional two-part solvent based system which is put on using a standard 3/8 inch paint-type roller. The wear coat can be high-gloss, satin or matte finish.

Figure 9:
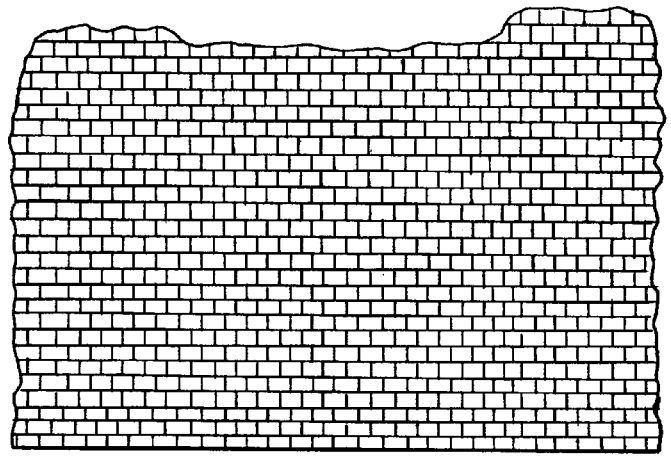
FIG. 9 illustrates a typical mesh (similar to a screen) which is used to reinforce the logo sheet member.

The poured and dried logo is then removed from the backing sheet of high-density polyethylene (by peeling off the sheet of high-density polyethylene) and is placed on a table with the finished side facing down, and the underside facing up. The logo section is then reinforced by applying a fiberglass mesh (similar to a fiberglass screen-type material), such as shown in FIG. 9, which is readily available from textile or fabrics manufacturers. The fiberglass mesh is cut (i.e., with scissors) to the exact size of the logo sheet and is laid out flat on the rear or back side of the logo sheet. A mix of epoxy (for example, the same epoxy mix used in the flooring system per se) is applied to the mesh using a standard 3/8 inch napp roller, working from the center out to the edges. Thereafter, the logo sheet section is allowed to dry for six to ten hours, or overnight. After drying, the reinforced logo sheet section is ready to be shipped to the installation site. The logo sheet section is preferably crated and shipped just as a large piece of glass would be. The logo sheet is usually large and can be, for example, up to about 4 feet by 8 feet, and even larger.

Once at the site where the logo sheet section is to be installed, it is adhered to a prepared flooring substrate using standard adhesives or standard epoxy adhesives, or construction-type adhesives that are normally used for construction walls. The sub-floor must be prepared in the same manner as it would be for any epoxy floor. It should clean, dry and free from grease. Once the logo sheet is mounted and adhered in place on the floor, the surrounding floor is poured to the same height of the logo, in the manner described hereinabove.

Figure 10:
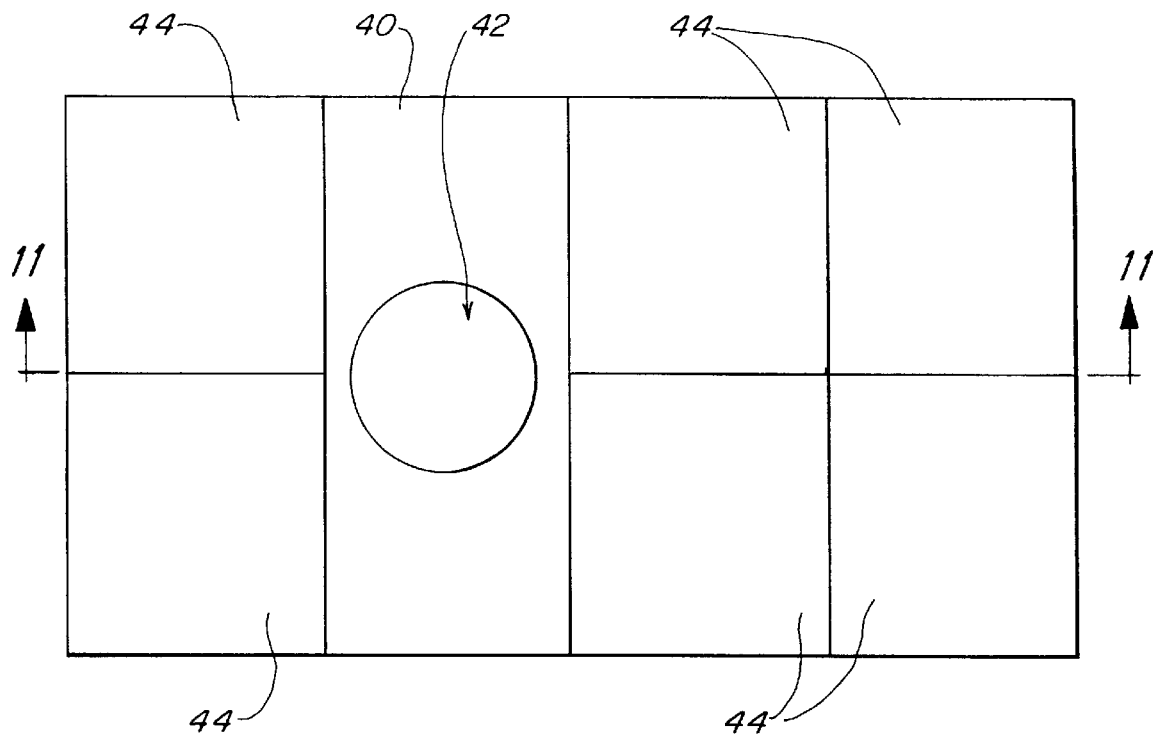
FIG. 10 shows plywood sheets used in a flooring system, in combination with a logo portion formed on a plywood sheet.

The logo or design can also be prepared on a plywood sheet (instead of the high-density polyethylene sheet) to thereby create the logo on the same material which is used on a sub-floor surrounding the logo portion. See FIGS. 10 and 11. The logo shown generally by circle 42 in FIG. 10 is mounted on a sheet of plywood 40 (which is surrounded by other plywood sheets 44 of the subflooring). The same steps as described above are carried out, except that the logo 42 is not separated from the plywood sheet 40. Instead, the logo 42 together with the plywood sheet 40 to which it is adhered are shipped to the location and are mounted to the floor, along with other plywood or sub-flooring sheets 44. The plywood sheet 40 with the logo thereon is adhered to the floor in the same manner as described above, or can be screwed or nailed down to the floor. The adjacent plywood sheets are also applied to the floor, for example, as shown in FIG. 10, so as to create a level surface at the plywood floor height. Then, the floor is poured over the plywood to the height of the logo. See FIG. 11 showing a sectional view of the completed floor with the logo and the surrounding plywood sheets and poured floor.

Figure 11:
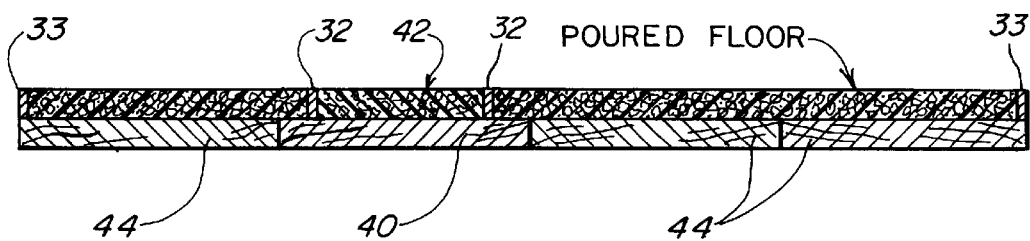
FIG. 11 is a sectional view taken along line 11—11 in FIG. 10.

FIG. 11 shows a sectional view of a completed logo section with the dividing strips permanently in place. The edging strips 33 are preferably thinner than the dividing strips 32, for appearance. However, the edging strips 33 and the dividing strips 32 may have the same thicknesses, if desired.

While the invention has been described above with respect to specific examples and specific embodiments, it should be clear that various features of the invention as described in the different examples and different embodiments can be combined within the scope of the invention as defined in the appended claims.

What is claimed is:

1. A method of preparing a composite flooring, comprising:

providing a quantity of small stones;

mixing said quantity of small stones, with a predetermined quantity for coloring the stones of liquid colorant, in a mixing device for a predetermined period of time to produce colored stones and wherein said liquid colorant is latex paint to which 0.5 to 3% of a cross-linking agent has been added to improve hardening of the paint;

drying the colored stones after they have been mixed with said liquid colorant for said predetermined period of time;

mixing said dried colored stones with an epoxy resin to form a mix;

pouring said mix of stones and epoxy resin onto a floor surface;

substantially evening out the surface of said poured mix on said flooring surface;

applying a first epoxy layer over the poured mix after evening thereof; thereafter smoothing the upper surface of said first epoxy layer; and permitting the applied epoxy layer to dry and harden, to complete the composite flooring system.

2. The method of claim 1, further comprising applying a second epoxy layer over said dried first epoxy layer.

3. The method of claim 2, further comprising pouring a polyurethane wear coat over said second epoxy layer after said second epoxy layer dries.

4. The method of claim 1, wherein said step of mixing comprises mixing the stones in a ratio of about 400 lbs. of stones to about 1 gallon of liquid colorant.

5. The method of claim 4, wherein said stones have a range of diameters of from about 1/16 to about 1/4".

6. The method of claim 5, wherein said stones are white quartz stones.

7. The method of claim 6, wherein said mixing of said stones and liquid colorant comprises tumbling the mixed stones and liquid colorant for about 7–10 minutes in said mixing step.

8. The method of claim 5, wherein said mixing of said stones and liquid colorant comprises tumbling the mixed stones and liquid colorant for about 7–10 minutes in said mixing step.

9. The method of claim 4, wherein said mixing of said stones and liquid colorant comprises tumbling the mixed stones and liquid colorant for about 7–10 minutes in said mixing step.

10. The method of claim 4, wherein said stones are white quartz stones.

11. The method of claim 10, wherein said mixing of said stones and liquid colorant comprises tumbling the mixed stones and liquid colorant for about 7–10 minutes in said mixing step.

12. The method of claim 1, wherein said mixing of said stones and liquid colorant comprises tumbling the mixed stones and liquid colorant for about 7–10 minutes in said mixing step.

13. In a method of preparing a composite flooring wherein colored stones are mixed with a mixture of an epoxy resin and a hardening agent and the resulting flooring mixture cast into a flooring, troweled smooth and optionally sealed with one or two seal coats, the improvement wherein:

said colored stones are colored by a process comprising the steps of:

(a) mixing colored latex paint with 0.5 to 3% of a cross-linking agent for the paint to improve hardening;

(b) mixing stones with the colored latex paint and cross-linking agent in a ratio of about 400 lbs of stones to about 1 gal. of latex paint whereby the stones become coated with the latex paint; and thereafter (c) allowing the paint coated on the stones to harden before mixing with the mixture of epoxy resin and hardener.

14. The method of claim 13, wherein said stones are white quartz stones having diameters of from about $\frac{1}{16}$ to $\frac{1}{4}$ inches.

15. The method of claim 14, wherein said mixing step (a) comprises tumbling said stones in said colored latex paint in a tumbler for about 7–10 minutes.

16. The method of claim 13, wherein the epoxy resin comprises approximately 40% of a flexibilizer and the casting of the mixture into a flooring comprises casting a sheet which is optionally cut to size as required.

* * * * *